United States Patent
Lu et al.

(10) Patent No.: US 11,956,210 B2
(45) Date of Patent: Apr. 9, 2024

(54) METHOD AND APPARATUS FOR TRANSMITTING APPLICATION PROGRAMMING INTERFACE API REQUEST

(71) Applicant: HUAWEI TECHNOLOGIES CO., LTD., Shenzhen (CN)

(72) Inventors: Xin Lu, Shenzhen (CN); Jin Chen, Shenzhen (CN); Yugeng Hui, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 933 days.

(21) Appl. No.: 16/933,195

(22) Filed: Jul. 20, 2020

(65) Prior Publication Data

US 2020/0351243 A1 Nov. 5, 2020

Related U.S. Application Data

(63) Continuation of application No. PCT/CN2019/077392, filed on Mar. 8, 2019.

(30) Foreign Application Priority Data

Mar. 13, 2018 (CN) .................. 201810203025.X

(51) Int. Cl.
  *H04L 9/40* (2022.01)
  *G06F 9/54* (2006.01)
  *H04L 67/60* (2022.01)

(52) U.S. Cl.
  CPC .......... *H04L 63/0236* (2013.01); *G06F 9/547* (2013.01); *H04L 63/105* (2013.01); *H04L 67/60* (2022.05)

(58) Field of Classification Search
  CPC ... H04L 63/0236; H04L 63/105; H04L 67/60; H04L 45/50; H04L 67/63; H04L 63/20; G06F 9/547
  See application file for complete search history.

(56) References Cited

U.S. PATENT DOCUMENTS

2013/0282920 A1* 10/2013 Zhang ................ H04L 67/5682
  709/238
2015/0163251 A1  6/2015 Kassaei et al.
(Continued)

FOREIGN PATENT DOCUMENTS

CN  101197795 A  6/2008
CN  103607403 A  2/2014
(Continued)

OTHER PUBLICATIONS

European Search Report issued in corresponding European Application No. 19767599.4, dated Dec. 14, 2020, pp. 1-9, European Patent Office, Munich Germany.
(Continued)

*Primary Examiner* — Beemnet W Dada
(74) *Attorney, Agent, or Firm* — HAUPTMAN HAM, LLP

(57) ABSTRACT

A method for transmitting an application programming interface API request includes receiving, by a first API gateway, a first API request; obtaining, by the first API gateway, a first forwarding label corresponding to the first API request, where the first forwarding label includes a first target security domain identifier, and a security domain identifier of the first API gateway is different from the first target security domain identifier. The method also includes determining an address of a second API gateway according to a mapping relationship between the first target security domain identifier and the address of the second API gateway. The method additionally includes sending the first API (Continued)

request to the second API gateway based on the address which is a next-hop API gateway of the first API gateway that sends the first API request to an API gateway corresponding to the first target security domain identifier.

20 Claims, 6 Drawing Sheets

(56) References Cited

U.S. PATENT DOCUMENTS

2016/0092297 A1 3/2016 Mazon et al.
2017/0230459 A1 8/2017 Lin et al.

FOREIGN PATENT DOCUMENTS

| CN | 103718527 A | 4/2014 |
| CN | 104320332 A | 1/2015 |
| CN | 105827446 A | 8/2016 |
| CN | 106295330 A | 1/2017 |
| CN | 106341399 A | 1/2017 |
| CN | 106533944 A | 3/2017 |
| JP | 2000232476 A | 8/2000 |
| WO | 2015117050 A1 | 8/2015 |
| WO | 2018044604 A1 | 3/2018 |

OTHER PUBLICATIONS

Yujin Huai, Enterprise Mobile Platform Security Solution Based on Signature Verification and Grade Control Technology 2013, total 76 pages.

International Search Report issued in corresponding International Application No. PCT/CN2019/077392, dated May 27, 2019, National Intellectual Property Administration, PRC, Beijing, China.

Japanese Office Action issued in corresponding Japanese Application No. 2020-536559, dated Sep. 7, 2021, pp. 1-5.

* cited by examiner

METHOD AND APPARATUS FOR TRANSMITTING APPLICATION PROGRAMMING INTERFACE API REQUEST

CROSS-REFERENCE TO RELATED APPLICATIONS

This application is a continuation of International Application No. PCT/CN2019/077392, filed on Mar. 8, 2019, which claims priority to Chinese Patent Application No. 201810203025.X, filed on Mar. 13, 2018. The disclosures of the aforementioned applications are hereby incorporated by reference in their entireties.

TECHNICAL FIELD

This application relates to the field of computer technologies, and in particular, to a method and an apparatus for transmitting an application programming interface (API) request.

BACKGROUND

Currently, with development of Internet technologies and application software technologies, a microservice architecture gradually becomes a mainstream application architecture due to advantages such as easy to maintain and fast iteration, and the like. In the microservice architecture, developers can split an application into a plurality of independent servers and divide the servers into a plurality of security domains based on the security levels of the servers. API gateway is set in each security domain, to receive an API request sent by a client, and forward the API request to a corresponding server.

In the prior art, an API request sent by a client carries a request address. When receiving the API request, the API gateway parses the API request to obtain the request address, and then queries a prestored mapping table between a request address and a service address based on the request address, to obtain a target service address. If the target service address is a service address of a security domain to which the API gateway belongs, the API gateway forwards the API request to a corresponding server. If the target service address is an address of an API gateway in another security domain (that is, the API request needs to cross a plurality of security domains), the API request is sent to a next-hop API gateway, and the next-hop API gateway performs the foregoing processing until the API request is forwarded to a corresponding server.

However, based on the prior art, when an API request needs to cross a plurality of security domains, an API gateway in each security domain needs to search a prestored mapping table between a request address and a service address. Because there are a relatively large quantity of entries in the mapping table, a query takes a relatively long time, and API request efficiency is affected.

SUMMARY

The discussed embodiments provide a method for transmitting an application programming interface API request, to improve API request efficiency. Technical solutions are as follows:

According to a first aspect, a method for transmitting an application programming interface API request is provided, where the method includes:

receiving, by a first API gateway, a first API request; obtaining, by the first API gateway, a first forwarding label corresponding to the first API request, where the first forwarding label includes a first target security domain identifier, and a security domain identifier of the first API gateway is different from the first target security domain identifier; determining, by the first API gateway, an address of the second API gateway according to a mapping relationship between the first target security domain identifier and the address of the second API gateway; and sending the first API request to the second API gateway based on the address of the second API gateway, where the second API gateway is a next-hop API gateway of the first API gateway that sends the first API request to an API gateway corresponding to the first target security domain identifier.

In this embodiment, after receiving the first API request, the first API gateway may determine, based on a mapping table of the first forwarding label, the first forwarding label corresponding to the first API request, where the first forwarding label includes the first target security domain identifier. Then, the first API gateway determines the address of the second API gateway according to the mapping relationship between the first target security domain identifier and the address of the second API gateway, and sends the first API request to the second API gateway. Subsequently, the second API gateway may directly perform processing based on the first forwarding label. Because a quantity of security domain identifiers is far less than a quantity of requested addresses, a quantity of queries in the mapping table between a requested address and a service address is reduced, thereby improving the API request efficiency.

In a possible implementation, the obtaining, by the first API gateway, a first forwarding label corresponding to the first API request includes:

obtaining a request path carried in the first API request; and determining the first forwarding label according to the mapping table between the request path and the first forwarding label.

In a possible implementation, the obtaining, by the first API gateway, a first forwarding label corresponding to the first API request includes:

obtaining a request path and a first parameter that are carried in the first API request, and the first parameter includes an API invocation method and/or a protocol version number; determining, based on the request path, the first parameter, and a preset eigenvalue algorithm, an eigenvalue corresponding to the first API request; and determining the first forwarding label according to a mapping table between the eigenvalue and the first forwarding label.

In a possible implementation, the obtaining, by the first API gateway, a first forwarding label corresponding to the first API request includes:

obtaining a request path, a second parameter, and a third parameter that are carried in the first API request, and the second parameter includes an API invocation method and/or a protocol version number, and the third parameter includes a request header and/or a request additional parameter; determining, based on the request path, the second parameter, and a preset eigenvalue algorithm, an eigenvalue corresponding to the first API request; and determining the first forwarding label according to a mapping table between the eigenvalue, the third parameter, and the first forwarding label.

In a possible implementation, the method further includes:

receiving, by the first API gateway, a second API request; and the second API request carries a second forwarding label, and the second forwarding label includes the security domain identifier of the first API gateway and a first target service address; deleting, by the first API gateway, a second forwarding label in the second API request; and sending, by the first API gateway to a server corresponding to the first target service address, the second API request from which the second forwarding label is deleted.

In a possible implementation, the method further includes:

receiving, by the first API gateway, a third API request; obtaining, by the first API gateway, a third forwarding label corresponding to the third API request, and the third forwarding label includes the security domain identifier of the first API gateway and a second target service address; and sending, by the first API gateway, the third API request to a server corresponding to the second target service address.

According to a second aspect, an apparatus for transmitting an application programming interface API request is provided, where the apparatus is applied to a first API gateway, and the apparatus includes:

a first receiving module, configured to receive a first API request; a first obtaining module, configured to obtain a first forwarding label corresponding to the first API request, where the first forwarding label includes a first target security domain identifier, and a security domain identifier of the first API gateway is different from the first target security domain identifier; and a first sending module, configured to: determine an address of the second API gateway according to a mapping relationship between the first target security domain identifier and the address of the second API gateway; and send the first API request to the second API gateway based on the address of the second API gateway, where the second API gateway is a next-hop API gateway of the first API gateway that sends the first API request to an API gateway corresponding to the first target security domain identifier.

In a possible implementation, the first obtaining module is configured to:

obtain a request path carried in the first API request; and determining the first forwarding label according to a mapping table between the request path and the first forwarding label.

In a possible implementation, the first obtaining module is configured to:

obtain a request path and a first parameter that are carried in the first API request, and the first parameter includes an API invocation method and/or a protocol version number; determine, based on the request path, the first parameter, and a preset eigenvalue algorithm, an eigenvalue corresponding to the first API request; and determine the first forwarding label according to a mapping table between the eigenvalue and the first forwarding label.

In a possible implementation, the first obtaining module is configured to:

obtain a request path, a second parameter, and a third parameter that are carried in the first API request, and the second parameter includes an API invocation method and/or a protocol version number, and the third parameter includes a request header and/or a request additional parameter; determine, based on the request path, the second parameter, and a preset eigenvalue algorithm, an eigenvalue corresponding to the first API request; and determine the first forwarding label according to a mapping table between the eigenvalue, the third parameter, and the first forwarding label.

In a possible implementation, the apparatus further includes:

a second receiving module, configured to receive a second API request, where the second API request carries a second forwarding label, and the second forwarding label includes the security domain identifier of the first API gateway and a first target service address; and a deletion module, configured to delete the second forwarding label from the second API request; and a second sending module, configured to send, to a server corresponding to the first target service address, the second API request from which the second forwarding label is deleted.

In a possible implementation, the apparatus further includes:

a third receiving module, configured to receive a third API request; a second obtaining module, configured to obtain a third forwarding label corresponding to the third API request, and the third forwarding label includes the security domain identifier of the first API gateway and a second target service address; and a third sending module, configured to send the third API request to a server corresponding to the second target service address.

According to a third aspect, an application programming interface API gateway is provided, where the API gateway includes a memory, a processor, and a communications interface, where the memory is configured to store a program instruction; and the processor is configured to perform the following operations based on the program instruction stored in the memory: receiving a first API request by using the communications interface; obtaining a first forwarding label corresponding to the first API request, where the first forwarding label includes a first target security domain identifier, and a security domain identifier of the first API gateway is different from the first target security domain identifier; determining an address of the second API gateway according to a mapping relationship between the first target security domain identifier and the address of the second API gateway; and sending the first API request to the second API gateway based on the address of the second API gateway by using the communications interface, where the second API gateway is a next-hop API gateway of the first API gateway that sends the first API request to an API gateway corresponding to the first target security domain identifier.

In a possible implementation, the processor is configured to:

obtain a request path carried in the first API request; and determining the first forwarding label according to a mapping table between the request path and the first forwarding label.

In a possible implementation, the processor is configured to:

obtain a request path and a first parameter that are carried in the first API request, and the first parameter includes an API invocation method and/or a protocol version number; determine, based on the request path, the first parameter, and a preset eigenvalue algorithm, an eigenvalue corresponding to the first API request; and determining the first forwarding label according to a mapping table between the eigenvalue and the first forwarding label.

In a possible implementation, the processor is configured to:
obtain a request path, a second parameter, and a third parameter that are carried in the first API request, and the second parameter includes an API invocation method and/or a protocol version number, and the third parameter includes a request header and/or a request additional parameter; determine, based on the request path, the second parameter, and a preset eigenvalue algorithm, an eigenvalue corresponding to the first API request; and determine the first forwarding label according to a mapping table between the eigenvalue, the third parameter, and the first forwarding label.

In a possible implementation, the processor is further configured to perform the following operations based on the program instruction stored in the memory:
receiving a second API request by using the communications interface; and the second API request carries a second forwarding label, and the second forwarding label includes the security domain identifier of the first API gateway and a first target service address; and deleting a second forwarding label in the second API request; and sending, by the communications interface, the second API request from which the second forwarding label is deleted to the server corresponding to the first target service address.

In a possible implementation, the processor is further configured to perform the following operations based on the program instruction stored in the memory:
receiving a third API request by using the communications interface; obtaining a third forwarding label corresponding to the third API request, and the third forwarding label includes the security domain identifier of the first API gateway and a second target service address; and sending, by the communications interface, the third API request to a server corresponding to the second target service address.

According to a fourth aspect, a computer-readable storage medium is provided, including an instruction, when the instruction runs on a computer, the computer is enabled to perform the method according to the first aspect.

In this embodiment, the first API gateway receives the first API request, and may forward the first API request based on the first target security domain identifier in the first forwarding label. Because a quantity of security domain identifiers is far less than a quantity of requested addresses, a quantity of queries in the mapping table between a requested address and a service address is reduced, thereby improving API request efficiency.

DESCRIPTION OF EMBODIMENTS

Figure 1:
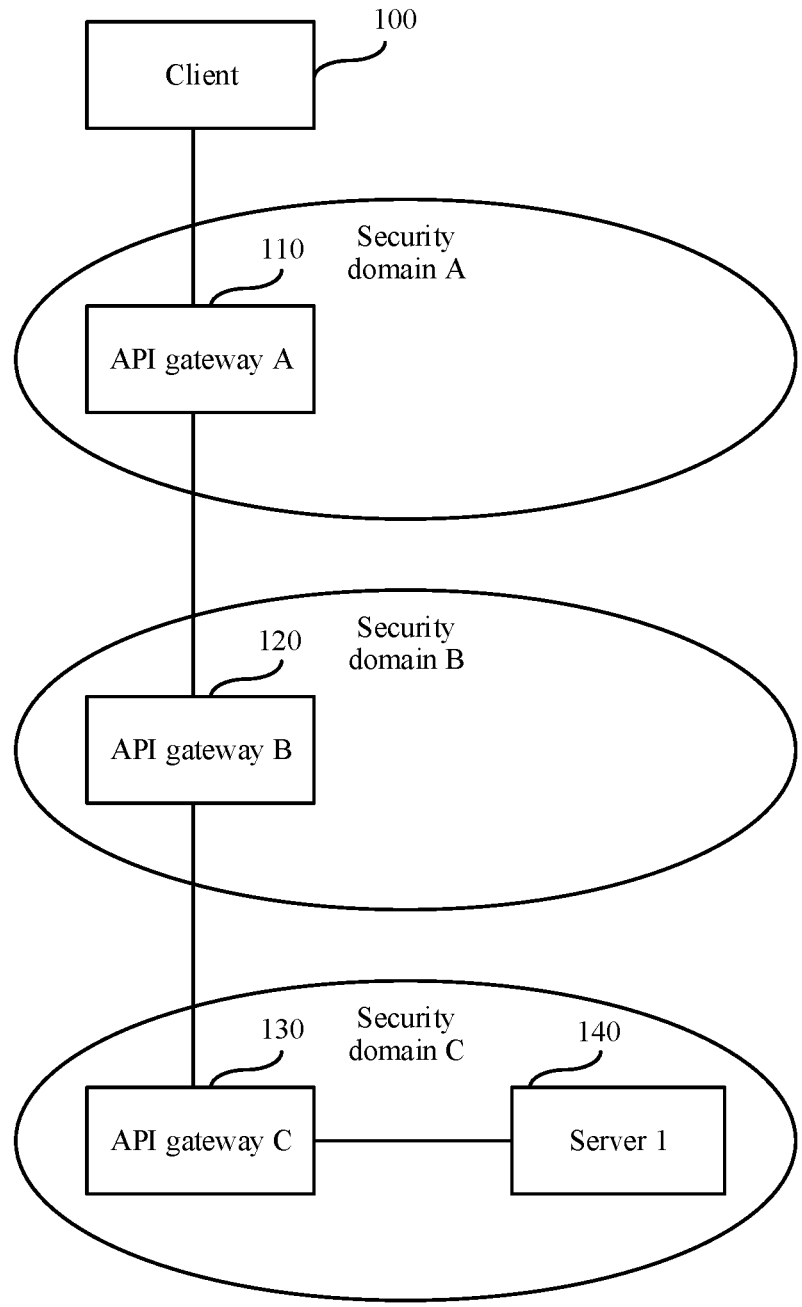
FIG. 1 is an example diagram of a network system according to one or more embodiments.
Figure 2:
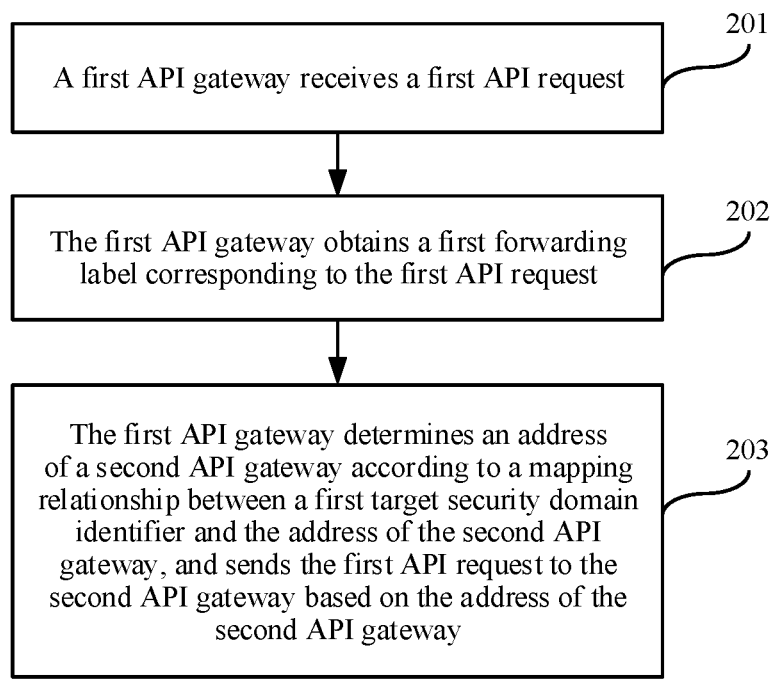
FIG. 2 is a flowchart of a method for transmitting an API request according to one or more embodiments.

An embodiment of the present disclosure provides a method for transmitting an API request. The method may be applied to a scenario of transmitting an API request across security domains. FIG. 1 is an example diagram of a network system according to one or more embodiments. The network system includes three security domains: a security domain A, a security domain B, and a security domain C. An API gateway A is disposed in the security domain A, an API gateway B is disposed in the security domain B, and an API gateway C is disposed in the security domain C, and a plurality of servers may be disposed in each security domain. When a client needs to access a server 1 in the security domain C, the client that accesses the security domain A may send an API request to the API gateway A, the API gateway A sends the API request to the API gateway C by using the API gateway B, and the API gateway C forwards the API request to the server 1 for processing after receiving the API request. In this embodiment, the security domain may refer to a security level. Different services have different security levels, and the different services are located in corresponding security domains.

An embodiment of the present disclosure provides a method for transmitting an API request, to improve API request efficiency. A specific processing procedure is as follows:

Step 201: A first API gateway receives a first API request.

During implementation, the first API gateway may receive the first API request, where the first API request may be an API request sent by the client, or may be an API request forwarded by another API gateway. For example, when the client needs to access the server, the client may send the first API request to the first API gateway in the security domain to which the client belongs. For another example, after an API gateway receives a first API request sent by a client, if a server corresponding to the first API request is not in a security domain to which the API gateway belongs, the API gateway may forward the first API request to the first API gateway according to a prestored policy. The first API request may carry a request path, and may further carry one or more of information such as an API invocation method, a protocol version number, a request header, and a request additional parameter. That the server corresponding to the first API request is not in the security domain to which the first API gateway belongs may also be referred to as that the server corresponding to the first API request is not disposed in the security domain to which the first API gateway belongs, or the server corresponding to the first API request is not in the security domain to which the first API gateway belongs.

Step 202: The first API gateway obtains a first forwarding label corresponding to the first API request.

The first forwarding label may include a first target security domain identifier, and a security domain identifier of the first API gateway is different from the first target security domain identifier. The target security domain identifier may be an identifier of a security domain to which the target server that the client needs to access belongs.

During implementation, after receiving the first API request, the first API gateway parses the first API request, determines whether the first API request carries the first forwarding label, and further obtains, based on a determining result, the first forwarding label corresponding to the first API request. There are two cases:

In a first case, if the first API request carries the first forwarding label, the first API gateway obtains the first forwarding label carried in the first API request.

During implementation, when the first API gateway receives the first API request forwarded by the another API gateway, the first API request carries the first forwarding label added by the another API gateway. The first API gateway may parse the first API request to obtain the first forwarding label carried in the first API request.

In a second case, if the first API request does not carry the first forwarding label, the first API gateway determines the first forwarding label corresponding to the first API request according to a prestored mapping table between the first API request and the first forwarding label.

During implementation, the first API gateway prestores the mapping table of the first forwarding label, and the mapping table of the first forwarding label may be set by an administrator based on an actual service. When the first API gateway receives the first API request sent by the client, and the first API request does not carry the first forwarding label, the first API gateway may determine, according to the prestored mapping table between the first API request and the first forwarding label, the first forwarding label corresponding to the first API request. There may be various manners of determining the first forwarding label corresponding to the first API request. This embodiment provides several feasible processing manners.

In a first manner, the first API gateway may determine, based on the request path, the first forwarding label corresponding to the first API request. A specific processing procedure is as follows:

Step 1: Obtain the request path carried in the first API request.

During implementation, after receiving the first API request, the first API gateway may parse the first API request to obtain the request path carried in the first API request. The request path is a path part in a uniform resource locator (URL) carried in the first API request. For example, if the URL in the hypertext transfer protocol (HTTP) is http://192.168.1.1/test, the request path is /test.

Step 2: Determine the first forwarding label based on a mapping table of the request path and the first forwarding label.

The mapping table of the first forwarding label includes a mapping relationship between the request path and the first forwarding label.

During implementation, the first API gateway may prestore the mapping table of the first forwarding label, and the mapping table of the first forwarding label may be set by an administrator based on an actual service. The mapping table of the first forwarding label includes the mapping relationship between the request path and the first forwarding label. Table 1 shows an example of the mapping table of the first forwarding label. The request path is /test, and the first target security domain identifier in the first forwarding label corresponding to the request path is A.

TABLE 1

| Request path | First target security domain identifier |
|---|---|
| /test | A |

After obtaining the request path carried in the first API request, the first API gateway may query, in the mapping table of the first forwarding label, an entry including the request path, and further obtain the first forwarding label in the entry, to obtain the first forwarding label corresponding to the request path.

In a second manner, the first API gateway may determine, based on an eigenvalue, the first forwarding label corresponding to the first API request. A specific processing procedure is as follows:

Step 1: Obtain the request path and a first parameter that are carried in the first API request.

The first parameter includes an API invocation method and/or a protocol version number.

During implementation, after receiving the first API request, the first API gateway may parse the first API request, to obtain the request path and the first parameter that are carried in the first API request. The first parameter may include an API invocation method and/or a protocol version number. The HTTP protocol is used as an example, an API invocation method is an invocation method in the HTTP protocol, such as get, post, put, delete, head, connect, options, and trace invocation methods. The protocol version number is an HTTP protocol version number, for example, http1.0 or http1.1.

Step 2: Determine, based on the request path, the first parameter, and a preset eigenvalue algorithm, an eigenvalue corresponding to the first API request.

During implementation, the first API gateway may prestore an eigenvalue algorithm, and the eigenvalue algorithm may be set by an administrator. For example, the eigenvalue algorithm may be a hash algorithm, or may be another eigenvalue algorithm. This is not limited, however.

After obtaining the request path and the first parameter that are carried in the first API request, the first API gateway may calculate the eigenvalue based on the prestored eigenvalue algorithm, the request path, and the first parameter. For example, the first API gateway may calculate a hash value based on a prestored hash algorithm, the request path, and the first parameter.

Step 3: Determine the first forwarding label according to the mapping table between the eigenvalue and the first forwarding label.

The mapping table of the first forwarding label includes a mapping relationship between an eigenvalue and the first forwarding label.

During implementation, the first API gateway prestores the mapping table of the first forwarding label, and the mapping table of the first forwarding label may be set by an administrator. The mapping table of the first forwarding label includes a mapping relationship between an eigenvalue and the first forwarding label. Table 2 shows an example of the mapping table of the first forwarding label, where an eigenvalue is 0xA26067F3, and a first target security domain identifier in a first forwarding label corresponding to the eigenvalue is A.

TABLE 2

| feature value | First target security domain identifier |
|---|---|
| 0xA26067F3 | A |

After determining the eigenvalue corresponding to the first API request, the first API gateway may query the entry including the eigenvalue in the mapping table of the first forwarding label, to obtain the first forwarding label in the entry, to obtain the first forwarding label corresponding to the eigenvalue.

In a third manner, the first API gateway may determine, based on the eigenvalue and a third parameter, the first forwarding label corresponding to the first API request. A specific processing procedure is as follows:

Step 1: Obtain the request path, a second parameter, and the third parameter that are carried in the first API request.

The second parameter may include an API invocation method and/or a protocol version number, the third parameter may include a request header and/or a request additional parameter, and the request header and the request additional parameter may be stored in a key-value storage manner.

During implementation, after receiving the first API request, the first API gateway may parse the first API request to obtain the request path, the second parameter, and the third parameter that are carried in the first API request. It should be noted that the second parameter in this manner may be the same as or different from the first parameter in the second manner.

Step 2: Determine, based on the request path, the second parameter, and a preset eigenvalue algorithm, an eigenvalue corresponding to the first API request.

During implementation, the first API gateway may prestore an eigenvalue algorithm, and the eigenvalue algorithm may be set by an administrator. The eigenvalue algorithm may be a hash algorithm, or may be another eigenvalue algorithm. This is not limited, however.

After obtaining the request path and the second parameter that are carried in the first API request, the first API gateway may calculate the eigenvalue based on the prestored eigenvalue algorithm, the request path, and the second parameter. For example, the first API gateway may calculate the hash value based on a prestored hash algorithm, the request path, and the second parameter.

Step 3: Determine the first forwarding label according to the mapping table between the eigenvalue, the third parameter, and the first forwarding label.

The mapping table of the first forwarding label includes a mapping relationship among the eigenvalue, the third parameter, and the first forwarding label.

During implementation, the first API gateway prestores the mapping table of the first forwarding label, and the mapping table of the first forwarding label may be set by an administrator based on an actual service. The mapping table of the first forwarding label includes a mapping relationship among the eigenvalue, the third parameter, and the first forwarding label. Table 3 shows an example of the mapping table of the first forwarding label, where the eigenvalue is 0xA26067F3, the request header is qq.com, the request additional parameter is 1, and the first target security domain identifier in the first forwarding label corresponding to the request additional parameter is A.

TABLE 3

| feature value | Request header. | Additional request parameters | First target security domain identifier |
|---|---|---|---|
| 0xA26067F3 | qq.com | 1 | A |

After determining the eigenvalue corresponding to the first API request, the first API gateway may query the mapping table of the first forwarding label based on the eigenvalue and the third parameter, to obtain the eigenvalue and the first forwarding label corresponding to the third parameter.

In addition, the first API gateway may further determine, in another manner, the first forwarding label corresponding to the first API request.

For example, the first API gateway may obtain the request path and the third parameter that are carried in the first API request, then calculate the eigenvalue based on a prestored eigenvalue algorithm, the request path, the third parameter, and further determine, according to the prestored mapping table between the eigenvalue and the first forwarding label, the first forwarding label corresponding to the first API request. The mapping table of the first forwarding label includes a mapping between an eigenvalue and the first forwarding label.

For another example, the first API gateway may obtain the request path, the second parameter, and the third parameter that are carried in the first API request, then calculate an eigenvalue based on a prestored eigenvalue algorithm, the request path, the second parameter, and the third parameter, and further determine, according to a prestored mapping table between the eigenvalue and the first forwarding label, the first forwarding label corresponding to the first API request. The mapping table of the first forwarding label includes a mapping relationship between an eigenvalue and the first forwarding label.

Step 203: The first API gateway determines an address of a second API gateway according to a mapping relationship between the first target security domain identifier and the address of the second API gateway, and sends the first API request to the second API gateway based on the address of the second API gateway.

The second API gateway is a next-hop API gateway of the first API gateway that sends the first API request to an API gateway corresponding to the first target security domain identifier.

In this embodiment, the first API gateway may forward the first API request based on the first target security domain identifier in the first forwarding label. Because a quantity of security domain identifiers is far less than a quantity of requested addresses, a quantity of queries in the mapping table between a requested address and a service address is reduced, thereby improving API request efficiency.

During implementation, the first API gateway may prestore the mapping relationship between the first target security domain identifier and the address of the second API gateway, and the mapping relationship may be set by an administrator. The mapping relationship may be shown in Table 4.

TABLE 4

| First target security domain identifier | Second API gateway address |
|---|---|
| A | 192.168.1.1 |

The first API gateway may query, in the mapping relationship between the first target security domain identifier and the address of the second API gateway, the address of the second API gateway corresponding to the first target security domain. The address of the second API gateway may be an internet protocol (IP) address, or may be another address used to identify the second API gateway. This is not limited, however.

After determining the address of the second API gateway, the first API gateway may forward the first API request to the second API gateway based on the address of the second API gateway.

Optionally, after receiving the second API request, the first API gateway may first delete the forwarding label in the second API request, and then forward the second API request to the server. The process is as follows:

Step 1: The first API gateway receives a second API request.

The second API request carries a second forwarding label, and the second forwarding label includes the security domain identifier of the first API gateway and the first target service address.

During implementation, when the first API gateway receives the second API request forwarded by the another API gateway, the second API request carries the second forwarding label added by the another API gateway. The first API gateway may parse the second API request to obtain the second forwarding label carried in the second API request.

Step 2: The first API gateway deletes a second forwarding label in the second API request.

During implementation, the first API gateway may prestore the security domain identifier of the security domain to which the first API gateway belongs. After determining the second forwarding label corresponding to the second API request, the first API gateway may determine whether the security domain identifier that is of the first API gateway and that is carried in the second forwarding label is the same as a locally prestored security domain identifier. If the security domain identifier is the same as the locally prestored security domain identifier, performs step 3.

Step 3: The first API gateway sends, to a server corresponding to a first target service address, the second API request from which the second forwarding label is deleted.

During implementation, if the first API gateway determines that the security domain identifier of the first API gateway carried in the second forwarding label is the same as the locally prestored security domain identifier, it indicates that the server corresponding to the second API request is located in the security domain of the first API gateway. That the server corresponding to the second API request is located in the security domain of the first API gateway may also be referred to as that the server corresponding to the second API request belongs to the security domain of the first API gateway, or the server corresponding to the second API request is disposed in the security domain of the first API gateway.

The first API gateway may determine, in the second API request, a location corresponding to the second forwarding label, then delete the second forwarding label, and finally forward, to the server corresponding to the first target service address, the second API request from which the second forwarding label is deleted, so that the server processes the second API request. This can reduce redundant information in the API request.

Optionally, after the first API gateway receives a third API request, if a server corresponding to the third API request is in the security domain of the first API gateway, the first API gateway directly forwards the third API request to the server. A specific processing procedure is as follows:

Step 1: The first API gateway receives the third API request.

Step 2: The first API gateway obtains a third forwarding label corresponding to the third API request.

The third forwarding label includes the security domain identifier of the first API gateway and a second target service address.

During implementation, the first API gateway prestores a mapping table of the third forwarding label, and the mapping table of the third forwarding label may be set by an administrator based on an actual service. When the first API gateway receives the third API request sent by the client, and the third API request does not carry the third forwarding label, the first API gateway may determine, based on the third API request and the prestored mapping table of the third forwarding label, the third forwarding label corresponding to the third API request. For a specific processing procedure, refer to step 202. Details are not described herein again.

Step 3: The first API gateway sends the third API request to the server corresponding to a second target service address.

During implementation, the first API gateway may prestore a security domain identifier of the security domain to which the first API gateway belongs. After determining the third forwarding label corresponding to the third API request, the first API gateway may determine whether the security domain identifier of the first API gateway carried in the third forwarding label is the same as a locally prestored security domain identifier.

If the first API gateway determines that the security domain identifier of the first API gateway carried in the third forwarding label is the same as the locally prestored security domain identifier, it indicates that the server corresponding to the third API request is located in the security domain of the first API gateway.

The first API gateway may forward the third API request to the server corresponding to the second target service address, so that the server processes the third API request.

It should be noted that, when the first API gateway receives the first API request sent by the client, because the first API request does not carry the first forwarding label, the first API gateway needs to first add the first forwarding label to the first API request, and forward the first API request to the second API gateway. A specific processing procedure is as follows: adding the first forwarding label to the first API request, and sending, to the second API gateway corresponding to the first target security domain identifier, the first API request to which the first forwarding label is added.

During implementation, the first API gateway may add the first forwarding label to a preset location in the first API request, and forward, to the second API gateway corresponding to the first target security domain identifier, the first API request to which the first forwarding label is added. In this way, the second API gateway may perform corresponding processing based on the first forwarding label.

It should be noted that, in this solution, the network system further includes a management server connected to the API gateway in each security domain, and the administrator may preconfigure a forwarding label mapping table on the management server. The API gateway in each security domain may obtain the forwarding label mapping table from the management server. This reduces workload of the administrator in configuring the forwarding label mapping table.

In addition, the mapping table of the first forwarding label may further include update duration of each entry. For each entry, when generating the entry, the first API gateway may assign a value to the update duration of the entry, and start a timer corresponding to the entry. When duration recorded by the timer reaches the update duration, the first API gateway may update the entry. As shown in Table 5, the update duration of the entry is 3000 s. When the duration recorded by the timer is equal to the update duration, the first API gateway may query, based on the request path, the management server for the security domain identifier and the service address corresponding to the request path. If the security domain identifier and the service address that are stored on the management server are the same as the security domain identifier and the service address that are stored on the first API gateway, the first API gateway may reset the timer to 0; if the security domain identifier and the service address that are stored on the first API gateway are different, update the security domain identifier and the service address that are stored on the first API gateway, and reset the timer to 0; and if the request path is not stored on the management server, delete the entry.

TABLE 5

| Request path | Security domain ID | IP address | Update duration |
|---|---|---|---|
| /test | A | /s1/request | 3000s |

Figure 3:
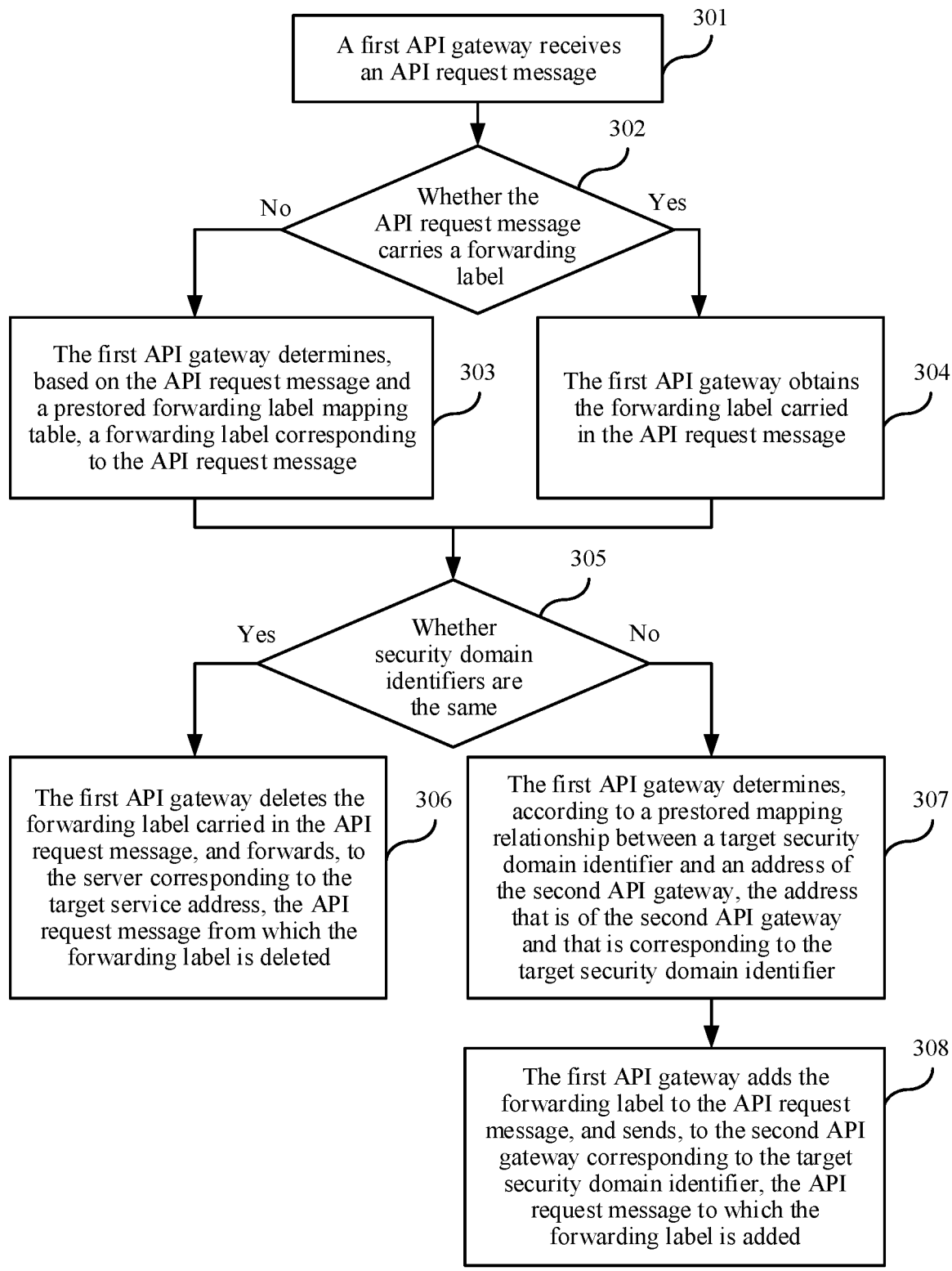
FIG. 3 is a flowchart of an example of transmitting an API request according to one or more embodiments.

FIG. 3 provides an example of transmitting an API request, in accordance with one or more embodiments. As shown in FIG. 3, the example includes the following steps:

Step 301: A first API gateway receives an API request.

Step 302: The first API gateway determines whether the API request carries a forwarding label, and if the API request carries the forwarding label, performs step 304 to step 305, and if the API request does not carry the forwarding label, performs step 303 and step 305.

Step 303: The first API gateway determines, based on the API request and a prestored mapping table of forwarding labels, a forwarding label corresponding to the API request, and performs step 305.

Step 304: The first API gateway obtains the forwarding label carried in the API request.

Step 305: The first API gateway determines whether a target security domain identifier is the same as a security domain identifier of the first API gateway, and if the target security domain identifier is the same as the security domain identifier of the first API gateway, performs step 306; and if the target security domain identifier is different from the security domain identifier of the first API gateway, performs step 307 to step 308.

Step 306: The first API gateway deletes the forwarding label carried in the API request, and forwards, to a server corresponding to a target service address, the API request from which the forwarding label is deleted.

Step 307: The first API gateway determines, based on a prestored mapping relationship between the target security domain identifier and an address of a second API gateway, the address that is of the second API gateway and that is corresponding to the target security domain identifier.

Step 308: The first API gateway adds the forwarding label to the API request, and sends, to the second API gateway corresponding to the target security domain identifier, the API request to which the forwarding label is added.

For a specific processing procedure of step 301 to step 308, refer to step 201 to step 203. Details are not described herein again.

In this embodiment, the first API gateway may forward the first API request based on the first target security domain identifier in the first forwarding label. Because a quantity of security domain identifiers is far less than a quantity of requested addresses, a quantity of queries in the mapping table between a requested address and a service address is reduced, thereby improving API request efficiency.

Figure 4:
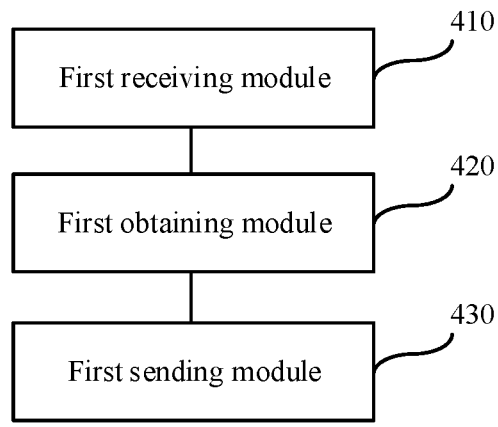
FIG. 4 is a schematic structural diagram of an apparatus for transmitting an API request according to one or more embodiments.

Based on a same technical concept, one or more embodiments further provide an apparatus for transmitting an application programming interface API request. The apparatus is applied to a first API gateway. As shown in FIG. 4, the apparatus includes:

a first receiving module 410, configured to receive a first API request;

a first obtaining module 420, configured to obtain a first forwarding label corresponding to the first API request, where the first forwarding label includes a first target security domain identifier, and a security domain identifier of the first API gateway is different from the first target security domain identifier.

a first sending module 430, configured to: determine an address of the second API gateway according to a mapping relationship between the first target security domain identifier and the address of the second API gateway; and send the first API request to the second API gateway based on the address of the second API gateway, where the second API gateway is a next-hop API gateway of the first API gateway that sends the first API request to an API gateway corresponding to the first target security domain identifier.

In a possible implementation, the first obtaining module 420 is configured to:

obtain a request path carried in a first API request; and determine the first forwarding label based on a mapping table of the request path and the first forwarding label.

In a possible implementation, the first obtaining module 420 is configured to:

obtain a request path and a first parameter that are carried in a first API request, where the first parameter includes an API invocation method and/or a protocol version number;

determine, based on the request path, the first parameter, and a preset eigenvalue algorithm, an eigenvalue corresponding to the first API request; and determine the first forwarding label according to a mapping table between the eigenvalue and the first forwarding label.

In a possible implementation, the first obtaining module 420 is configured to:

obtain a request path, a second parameter, and a third parameter that are carried in a first API request, where the second parameter includes an API invocation method and/or a protocol version number, and the third parameter includes a request header and/or a request additional parameter;

determine, based on the request path, the second parameter, and a preset eigenvalue algorithm, an eigenvalue corresponding to the first API request; and determine the first forwarding label according to a mapping table between the eigenvalue, the third parameter, and the first forwarding label.

Figure 5:
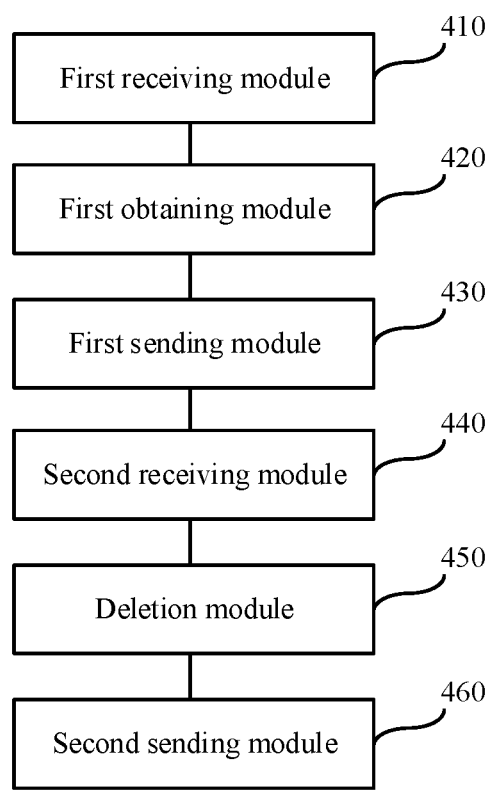
FIG. 5 is a schematic structural diagram of an apparatus for transmitting an API request according to one or more embodiments.

In a possible implementation, as shown in FIG. 5, the apparatus further includes:

a second receiving module 440, configured to receive a second API request; The second API request carries a second forwarding label, and the second forwarding label includes the security domain identifier of the first API gateway and the first target service address;

a deletion module 450, configured to delete the second forwarding label from the second API request; and a second sending module 460 is configured to send, to a server corresponding to the first target service address, the second API request from which the second forwarding label is deleted.

Figure 6:
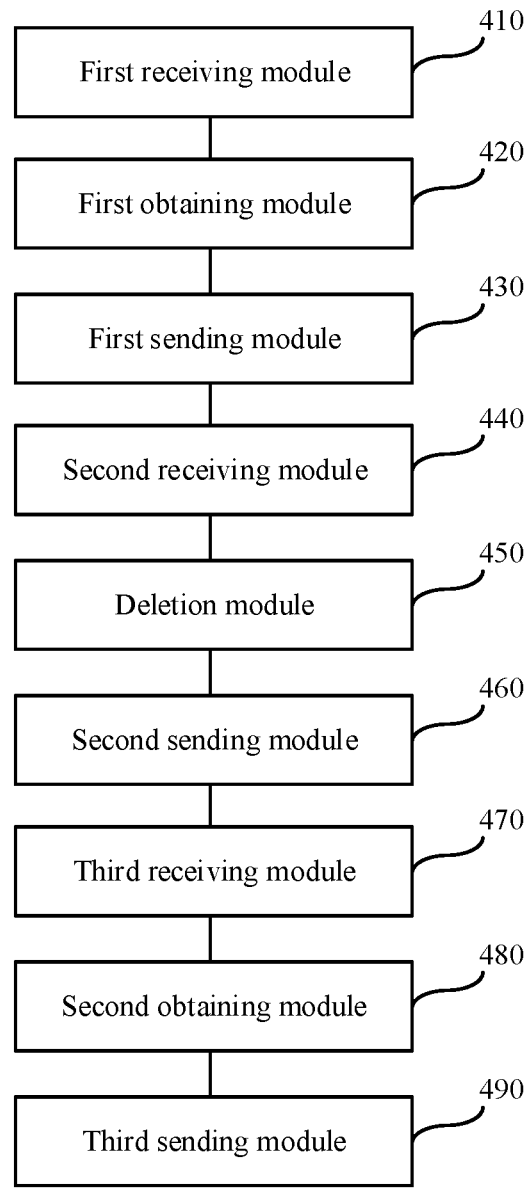
FIG. 6 is a schematic structural diagram of an apparatus for transmitting an API request according to one or more embodiments.

In a possible implementation, as shown in FIG. 6, the apparatus further includes:

a third receiving module 470, configured to receive a third API request;

a second obtaining module 480, configured to obtain a third forwarding label corresponding to the third API request, where the third forwarding label includes the security domain identifier of the first API gateway and a second target service address; and a third sending module 490 is configured to send the third API request to a server corresponding to the second target service address.

In this embodiment, after the first API gateway receives, by using the first receiving module 410, the first API request sent by the client, the first obtaining module 420 may determine, based on a mapping table of the first forwarding label, the first forwarding label corresponding to the first API request, where the first forwarding label includes the first target security domain identifier. Then, the first sending module 430 determines the address of a second API gateway according to the mapping relationship between the first target security domain identifier and the address of the second API gateway, and sends the first API request to the second API gateway. Subsequently, the second API gateway may directly perform processing based on the first forwarding label without querying the first forwarding label mapping table again, thereby improving API request efficiency.

Figure 7:
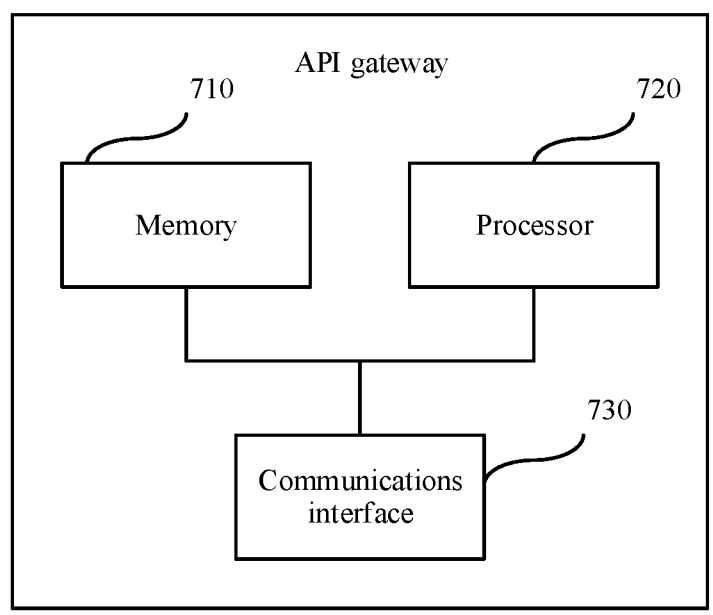
FIG. 7 is a schematic structural diagram of an API gateway according to one or more embodiments.

Based on a same technical concept, one or more embodiments further provide an application programming interface API gateway. As shown in FIG. 7, the API gateway includes a memory 710, a processor 720, and a communications interface 730.

The memory 710 is configured to store a program instruction.

The processor 720 is configured to perform the following operations based on the program instruction stored in the memory 710:

receiving a first API request by using the communications interface 730;

obtaining a first forwarding label corresponding to the first API request, where the first forwarding label includes a first target security domain identifier, and a security domain identifier of the first API gateway is different from the first target security domain identifier;

determining an address of the second API gateway according to a mapping relationship between the first target security domain identifier and the address of the second API gateway; and sending the first API request to the second API gateway based on the address of the second API gateway by using the communications interface 730, where the second API gateway is a next-hop API gateway of the first API gateway that sends the first API request to an API gateway corresponding to the first target security domain identifier.

In a possible implementation, that the processor 720 performs the operation of obtaining a first forwarding label corresponding to the first API request includes:

obtaining a request path carried in the first API request; and determining the first forwarding label according to a mapping table between the request path and the first forwarding label.

In a possible implementation, that the processor 720 performs the operation of obtaining a first forwarding label corresponding to the first API request includes:

obtaining a request path and a first parameter that are carried in the first API request, and the first parameter includes an API invocation method and/or a protocol version number;

determining, based on the request path, the first parameter, and a preset eigenvalue algorithm, an eigenvalue corresponding to the first API request; and determining the first forwarding label according to a mapping table between the eigenvalue and the first forwarding label.

In a possible implementation, that the processor 720 performs the operation of obtaining a first forwarding label corresponding to the first API request includes:

obtaining a request path, a second parameter, and a third parameter that are carried in the first API request, the second parameter includes an API invocation method and/or a protocol version number, and the third parameter includes a request header and/or a request additional parameter;

determining, based on the request path, the second parameter, and a preset eigenvalue algorithm, an eigenvalue corresponding to the first API request; and determining the first forwarding label according to a mapping table between the eigenvalue, the third parameter, and the first forwarding label.

In a possible implementation, the processor 720 is further configured to perform the following operations based on the program instruction stored in the memory 710:

receiving a second API request by using the communications interface 730; and the second API request carries a second forwarding label, and the second forwarding label includes the security domain identifier of the first API gateway and a first target service address;

deleting the second forwarding label from the second API request; and sending, by the communications interface 730, the second API request from which the second forwarding label is deleted to the server corresponding to the first target service address.

In a possible implementation, the processor 720 is further configured to perform the following operations based on the program instruction stored in the memory 710:

receiving a third API request by using the communications interface 730;

obtaining a third forwarding label corresponding to the third API request, and the third forwarding label includes the security domain identifier of the first API gateway and a second target service address; and sending, by the communications interface 730, the third API request to a server corresponding to the second target service address.

In some embodiments, the apparatus for transmitting an application programming interface API request provided in FIG. 4, FIG. 5, and FIG. 6 may be implemented by the API gateway shown in FIG. 7. In some embodiments, modules of the apparatuses in and FIG. 4, FIG. 5, and FIG. 6 may be implemented by a combination of the API gateway memory 710, the processor 720, and the interface 730 shown in FIG. 7. Alternatively, some parts may be implemented by the memory 710, the processor 720, and the interface 730, and other parts are implemented by dedicated hardware. In another implementation, the apparatus for transmitting an application programming interface API request provided in FIG. 4, FIG. 5, and FIG. 6 may alternatively be implemented by a dedicated hardware device.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to one or more embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) or wireless (such as infrared, radio, and microwave, or the like) manner. The computer-readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (such as DVD), a semiconductor medium (such as a solid-state drive Solid State Disk (SSD)), or the like.

What is claimed is:

1. A method for transmitting an application programming interface (API) request, the method comprising:
   receiving, by a first API gateway, a first API request;
   obtaining, by the first API gateway, a first forwarding label corresponding to the first API request, wherein the first forwarding label comprises a first target security domain identifier, and a security domain identifier of the first API gateway is different from the first target security domain identifier;
   determining, by the first API gateway, an address of a second API gateway according to a mapping relationship between the first target security domain identifier and the address of the second API gateway; and
   sending, by the first API gateway, the first API request to the second API gateway based on the address of the second API gateway, wherein the second API gateway is a next-hop API gateway of the first API gateway that sends the first API request to an API gateway corresponding to the first target security domain identifier.

2. The method according to claim 1, wherein the obtaining, by the first API gateway, of the first forwarding label corresponding to the first API request comprises:
   obtaining a request path carried in the first API request; and
   determining the first forwarding label according to a mapping table between the request path and the first forwarding label.

3. The method according to claim 1, wherein the obtaining, by the first API gateway, of the first forwarding label corresponding to the first API request comprises:
   obtaining a request path and a first parameter that are carried in the first API request, wherein the first parameter comprises one or more of an API invocation method or a protocol version number;
   determining, based on the request path, the first parameter, and a preset eigenvalue algorithm, an eigenvalue corresponding to the first API request; and
   determining the first forwarding label according to a mapping table between the eigenvalue and the first forwarding label.

4. The method according to claim 1, wherein the obtaining, by the first API gateway, of the first forwarding label corresponding to the first API request comprises:
   obtaining a request path, a second parameter, and a third parameter that are carried in the first API request, wherein the second parameter comprises one or more of an API invocation method or a protocol version number, and the third parameter comprises one or more of a request header or a request additional parameter;
   determining, based on the request path, the second parameter, and a preset eigenvalue algorithm, an eigenvalue corresponding to the first API request; and
   determining the first forwarding label according to a mapping table between the eigenvalue, the third parameter, and the first forwarding label.

5. The method according to claim 1, further comprising:
   receiving, by the first API gateway, a second API request, wherein the second API request carries a second forwarding label, and the second forwarding label comprises the security domain identifier of the first API gateway and a first target service address;
   deleting, by the first API gateway, the second forwarding label from the second API request; and
   sending, by the first API gateway to a server corresponding to the first target service address, the second API request from which the second forwarding label is deleted.

6. The method according to claim 5, further comprising:
   receiving, by the first API gateway, a third API request;
   obtaining, by the first API gateway, a third forwarding label corresponding to the third API request, wherein the third forwarding label comprises the security domain identifier of the first API gateway and a second target service address; and
   sending, by the first API gateway, the third API request to a server corresponding to the second target service address.

7. An apparatus for transmitting an application programming interface (API) request, wherein the apparatus is a first API gateway, and the apparatus comprises:
   a processor; and
   a computer readable storage medium having instructions stored thereon that, when executed by the processor, cause the apparatus to:
   receive a first API request;
   obtain a first forwarding label corresponding to the first API request, wherein the first forwarding label comprises a first target security domain identifier, and a security domain identifier of the first API gateway is different from the first target security domain identifier; and
   determine an address of a second API gateway according to a mapping relationship between the first target security domain identifier and the address of the second API gateway; and
   send the first API request to the second API gateway based on the address of the second API gateway, wherein the second API gateway is a next-hop API gateway of the first API gateway that sends the first API request to an API gateway corresponding to the first target security domain identifier.

8. The apparatus according to claim 7, wherein the apparatus is further caused to:
   obtain a request path carried in the first API request; and determine the first forwarding label according to a mapping table between the request path and the first forwarding label.

9. The apparatus according to claim 7, wherein the apparatus is further caused to:
obtain a request path and a first parameter that are carried in the first API request, wherein the first parameter comprises one or more of an API invocation method or a protocol version number;
determine, based on the request path, the first parameter, and a preset eigenvalue algorithm, an eigenvalue corresponding to the first API request; and
determine the first forwarding label according to a mapping table between the eigenvalue and the first forwarding label.

10. The apparatus according to claim 7, wherein the apparatus is further caused to:
obtain a request path, a second parameter, and a third parameter that are carried in the first API request, wherein the second parameter comprises one or more of an API invocation method or a protocol version number, and the third parameter comprises one or more of a request header or a request additional parameter;
determine, based on the request path, the second parameter, and a preset eigenvalue algorithm, an eigenvalue corresponding to the first API request; and
determine the first forwarding label according to a mapping table between the eigenvalue, the third parameter, and the first forwarding label.

11. The apparatus according to claim 7, wherein the apparatus is further caused to:
receive a second API request, wherein the second API request carries a second forwarding label, and the second forwarding label comprises the security domain identifier of the first API gateway and a first target service address;
delete the second forwarding label from the second API request; and
send, to a server corresponding to the first target service address, the second API request from which the second forwarding label is deleted.

12. The apparatus according to claim 11, wherein the apparatus is further caused to:
receive a third API request;
obtain a third forwarding label corresponding to the third API request, wherein the third forwarding label comprises the security domain identifier of the first API gateway and a second target service address; and
send the third API request to a server corresponding to the second target service address.

13. A non-transitory computer readable medium having instructions stored thereon that, when executed by a processor, cause an application programming interface (API) gateway to:
receive a first API request;
obtain a first forwarding label corresponding to the first API request, wherein the first forwarding label comprises a first target security domain identifier, and a security domain identifier of the API gateway is different from the first target security domain identifier;
determine an address of a different API gateway according to a mapping relationship between the first target security domain identifier and the address of the different API gateway; and
send the first API request to the different API gateway based on the address of the different API gateway, wherein the different API gateway is a next-hop API gateway of the API gateway that sends the first API request to an API gateway corresponding to the first target security domain identifier.

14. The non-transitory computer readable medium according to claim 13, wherein the API gateway is further caused to:
obtain a request path carried in the first API request; and
determine the first forwarding label according to a mapping table between the request path and the first forwarding label.

15. The non-transitory computer readable medium according to claim 13, wherein the API gateway is further caused to:
obtain a request path and a first parameter that are carried in the first API request, wherein the first parameter comprises an API invocation method and a protocol version number;
determine, based on the request path, the first parameter, and a preset eigenvalue algorithm, an eigenvalue corresponding to the first API request; and
determine the first forwarding label according to and a mapping table between the eigenvalue and the first forwarding label.

16. The non-transitory computer readable medium according to claim 13, wherein the API gateway is further caused to:
obtain a request path and a first parameter that are carried in the first API request, wherein the first parameter comprises an API invocation method;
determine, based on the request path, the first parameter, and a preset eigenvalue algorithm, an eigenvalue corresponding to the first API request; and
determine the first forwarding label according to and a mapping table between the eigenvalue and the first forwarding label.

17. The non-transitory computer readable medium according to claim 13, wherein the API gateway is further caused to:
obtain a request path and a first parameter that are carried in the first API request, wherein the first parameter comprises a protocol version number;
determine, based on the request path, the first parameter, and a preset eigenvalue algorithm, an eigenvalue corresponding to the first API request; and
determine the first forwarding label according to and a mapping table between the eigenvalue and the first forwarding label.

18. The non-transitory computer readable medium according to claim 13, wherein the API gateway is further caused to:
obtain a request path, a second parameter, and a third parameter that are carried in the first API request, wherein the second parameter comprises one or more of an API invocation method or a protocol version number, and the third parameter comprises one or more of a request header or a request additional parameter;
determine, based on the request path, the second parameter, and a preset eigenvalue algorithm, an eigenvalue corresponding to the first API request; and
determine the first forwarding label according to a mapping table between the eigenvalue, the third parameter, and the first forwarding label.

19. The non-transitory computer readable medium according to claim 13, wherein the API gateway is further caused to:
receive a second API request, wherein the second API request carries a second forwarding label, and the second forwarding label comprises the security domain identifier of the API gateway and a first target service address;

delete the second forwarding label from the second API request; and send, to a server corresponding to the first target service address, the second API request from which the second forwarding label is deleted.

20. The non-transitory computer readable medium according to claim 19, wherein the API gateway is further caused to:

receive a third API request;

obtain a third forwarding label corresponding to the third API request, wherein the third forwarding label comprises the security domain identifier of the API gateway and a second target service address; and send the third API request to a server corresponding to the second target service address.

* * * * *